United States Patent Office 3,404,131
Patented Oct. 1, 1968

3,404,131
ELASTIC FIBERS AND FILMS
Bernard Taub, Williamsville, N.Y., assignor to Allied Chemical Corporation, New York, N.Y., a corporation of New York
No Drawing. Filed Nov. 10, 1964, Ser. No. 410,267
9 Claims. (Cl. 260—77.5)

ABSTRACT OF THE DISCLOSURE

Production of synthetic linear, segmented polyether-urethane-urea polymers which are soluble in organic solvents and are suitable for preparation of elastic fibers and films having excellent color stability to ultraviolet light by (1) reacting a hydroxyl-terminated polyether with a molar insufficiency of an aromatic diisocyanate to produce a hydroxyl-terminated polyether-urethane, (2) reacting said hydroxyl-terminated polyether-urethane with an aliphatic diisocyanate to produce an isocyanate-terminated intermediate, and (3) reacting said isocyanate-terminated intermediate with a specific chain-extending agent, p-menthane-1,8-diamine. Chain extension preferably is effected in an organic solvent to produce a storage stable solution from which elastic fibers with good elastic recovery are obtained by conventional procedures, e.g. by extrusion into water or by dry-spinning. Films are produced by applying the solution to a suitable substrate from which the solvent evaporates.

---

This invention relates to elastic fibers, filaments and films, prepared from linear, segmented polymers comprising urea segments linked to polyether segments through urethane groups, such elastic fibers and films being non-yellowing.

Synthetic and natural polymers capable of being shaped into articles having elastic properties are well known; such products suffer, in general, from one or more deficiencies, such as unsuitability for spinning into elastic fibers, relatively low sticking temperatures, poor hydrolytic stability, and poor color stability to light, especially ultraviolet light. Until recently elastic filaments in the textile field have been produced from natural rubber. Most rubber fibers that are used in textile applications are narrow strips of film that have been cut from sheet rubber. Rubber fibers, currently, utilized in textiles have several disadvantages such as poor abrasion resistance at finer denier and poor durability in ultraviolet light. Many synthetic rubbers have been developed in recent years. Of these, polyurethane rubbers based on linear polyesters and linear polyethers have become well known.

Typical polyester urethane rubbers are described in articles by O. Bayer (Rubber Chemistry, 23, 812–835, 1950) and E. Muller (Rubber Chemistry, 26, 493–509, 1953) under the name of "Vulcollan." These rubbers are prepared by reacting an isocyanate-modified polyester with a suitable chain-extender, e.g., a diamine, to produce a linear polyester-urethane-urea intermediate which is then crosslinked or "cured" to produce the final "Vulcollan" product. Typical "Vulcollans" are produced by the processes of U.S. Patents 2,620,516 and 2,621,166. W. Brenschede, U.S. 2,755,266, teaches the preparation of elastic fibers from solutions of the "Vulcollan" products; in general, the fibers so obtained from aromatic diisocyanates possess good elastic properties but yellow on exposure to ultraviolet light. This yellowing can be overcome by the use of aliphatic disocyanates, as is known in coating and film technology. However, the substitution of the aromatic diisocyanate by an aliphatic diisocyanate results in deterioration of the physical properties of the elastic fiber e.g., diminished stretch resistance, decreased elastic recovery from hot water elongation, etc.

An object of this invention is to provide new synthetic linear segmented polyether-urethane-urea polymers which are soluble in organic solvents and are suitable for preparing elastic fibers and films. Another object is to provide elastic fibers and films composed of segmented polyether-urethane-ureas which have excellent color stability to ultraviolet light.

These objects are attained by the provision of elastic fibers and films having superior color stability to ultraviolet light and comprising a segmented substantially linear polyether-urethane-urea polymer. The polymer is prepared by reacting a difunctional hydroxyl-terminated substantially linear polyether with an aromatic diisocyanate to produce a hydroxyl terminated polyether containing urethane groups; this product is further reacted with an aliphatic diisocyanate, preferably a cycloaliphatic diisocyanate such as the solid trans-trans isomer of 4,4'-methylene bis(cyclohexylisocyanate) to obtain an isocyanate terminated intermediate. The intermediate is then admixed with an amine chain-extending agent, p-menthane-1,8-diamine, to form the polyether-urethane-urea copolymer. Chain extension preferably can take place in an organic solvent such as dimethylformamide to produce a storage stable solution from which elastic fibers with good elastic recovery are obtained by extrusion into water. Fibers can also be produced by dry spinning into hot air. Films are produced by applying the solution to a suitable substrate from which the solvent evaporates. Solutions of polyether-urethane-urea copolymers chain-extended with p-menthane-1,8-diamine do not gel in a short period of time. Consequently, the working life of the solution is not restricted. Further, the elastic fiber produced from a copolymer chain-extended with p-menthane-1,8-diamine does not hydrolyze or deteriorate in the hot water used for extrusion.

Conventional difunctional hydroxyl-terminated polyethers are used in the practice of this invention. The term "difunctional hydroxyl-terminated" is defined to mean that the polyether consists essentially of molecules with a terminal OH group on each end. A general discussion of the polyethers contemplated appears in Saunders et al., Polyurethanes: Chemistry and Technology, Part I, Chemistry, High Polymers, volume XVI, Interscience Publishers, New York, 1962, pp. 32–44 and 293–314. The hydrocarbon portion of the polyether or polyether polyol, is an alkylene group having from about 2 to about 20 carbon atoms and preferably from about 2 to about 4 carbon atoms. The polyether polyols can be represented by the formula $HO(RO)_nH$, wherein R is an alkylene radical or mixture of alkylene radicals and $n$ is an integer greater than 1. The alkylene radicals can be straight or branched chain. The molecular weight of the polyether polyol can be from about 700 to about 5000 and is, preferably, from about 1000 to 2000. Preferred polyethers are poly(oxytetramethylene) glycol and copolymers of propylene oxide with tetrahydrofuran.

The organic diisocyanate employed in the preparation of the hydroxyl terminated polyether containing urethane groups is an aromatic diisocyanate preferably a symmetrical aromatic diisocyanate such as 4,4'-methylene bis (phenylisocyanate) and 4,4'-methylene bis(3-methylphenylisocyanate) though an unsymmetrical diisocyanate such as toluene diisocyanate or m-phenylene diisocyanate can be used. The polyether-urethane so obtained preferably has a molecular weight of less than 5000 and is then reacted with an aliphatic diisocyanate. The preferred aliphatic diisocyanate used in this second reaction with the hydroxyl terminated polyether is a cycloaliphatic diisocyanate, the solid trans-trans isomer of 4,4'-methylene bis(cyclohexylisocyanate). Other suitable compounds include tetramethylene diisocyanate, hexamethylene diisocyanate, 4,4'-methylene bis(cyclohexylisocyanate), cyclohexane-1,4-diisocyanate, and 1,4-cyclohexane bis(methyl isocyanate).

The amount of diisocyanate used in the two stage polyether-isocyanate reaction is such that (1) in the first stage a molar insufficiency of diisocyanate is employed, i.e., the molar ratio of polyether to aromatic diisocyanate can be in the range of about 1.5:1 to about 2.5:1, preferably about 1.8:1 to about 2.2:1; (2) in the second stage the hydroxyl terminated polyether containing urethane groups is reacted with an excess of aliphatic diisocyanate to obtain an isocyanate terminated polyether urethane. The total amount of diisocyanate, i.e., aromatic and aliphatic diisocyanate, employed in the two stages is such that the ratio of the total NCO groups to OH groups based on the initial polyether glycol, is in the range of about 1.4:1 to about 1.9:1, preferably in the range of 1.5:1 to 1.7:1. Ratios of total NCO:OH greater than 2:1 such as can be utilized in my copending application Ser. No. 410,257, filed of even date, relating to polyester based elastic fibers, yield stiff non-elastic fibers. In order to obtain a faster reaction, the second stage can be carried out in the presence of well-known organo-tin catalysts such as dibutyl tin dilaurate or stannous octoate.

As noted, p-menthane-1,8-diamine, an amine chain-extending agent, is employed to prepare the polyether-urethane-urea intermediate for production of fibers or films. The isocyanate terminated polyether-urethane can be dissolved in a suitable organic solvent, preferably dimethyl formamide, and a solution of the amine in the same solvent can then be added with stirring to produce a chain-extended polyether-urethane-urea. Elastic fibers are obtained by extrusion of the solution of the polymer into a hot water bath. Fibers can also be produced by dry spinning into hot air. Films are produced by applying the solution to a suitable substrate from which the solvent evaporates. Other organic solvents which can be used are dimethyl acetamide, dimethyl propionamide, dimethylsulfoxide, and tetramethyl area.

The first and second stages of the process can be conducted at temperatures of about 70° C. to about 120° C.; however, about 100° C. is preferred. Admixing the intermediate with the amine chain-extending agent can take place at temperatures of about 0° C. to about 25° C., preferably about 5° C. to about 10° C. After extrusion in hot water (about 70° C. to less than about 100° C.), the elastic fibers can be cured in the conventional manner. Curing temperatures of about 100° C. to 150° C. can be used along with times of about 2 to about 8 hours.

The more detailed practice of the invention is illustrated by the following examples, in which parts and percentages given are by weight. It is not intended that the scope of the invention should be limited by these specific examples.

EXAMPLE 1

A mixture of 0.02 mol of polytetramethylene-ether glycol (average molecular weight 1117) and 0.01 mol of 4,4'-methylene bis(phenylisocyanate) was heated under anhydrous conditions for one hour at 100° C. To the hot reaction mixture there was added 0.02 mol of solid 4,4'-methylene bis(cyclohexylisocyanate) and a small amount (2 drops) of dibutyltin dilaurate; heating at 100° C. was continued for an additional hour to produce an isocyanate terminated intermediate having an NCO content of 2.29%.

A solution of 100 parts of intermediate dissolved in 250 parts of dimethylformamide was cooled to 5° C. before the addition of a solution of 4.63 parts of p-menthane-1,8-diamine in 50 parts of dimethylformamide. The mixture was agitated at ice temperature for about half an hour and agitation was continued at room temperature (about 25° C.) for two hours. The resulting viscous solution was storage stable; when cast onto glass and after evaporation of the solvent it produced highly elastic non-yellowing film which retained a high percentage of elasticity after immersion in hot water under tension.

EXAMPLE 2

A hydroxyl terminated substantially linear polyether (average molecular weight 968) was produced by the copolymerization of a mixture of propylene oxide (14%) and tetrahydrofuran (86%). A mixture of 0.03 mol of the polyether and 0.015 mol of 4,4'-methylene bis(phenylisocyanate) was heated under anhydrous conditions for one hour at 100° C. To the hot reaction mixture there was added 0.036 mol of solid 4,4'-methylene bis(cyclohexylisocyanate) and a small amount (2 drops) of dibutyltin dilaurate; heating at 100° C. was continued for an additional hour to produce an isocyanate-terminated intermediate prepolymer having an NCO content of 2.61%.

The intermediate (100 parts), in dimethylformamide (250 parts) solution, was chain-extended with 5.28 parts of p-menthane-1,8-diamine (dissolved in 50 parts of dimethylformamide) at about 5° C. as in Example 1 above.

EXAMPLE 3

A mixture of 0.03 mol of polyether (copolymerization product of 75% tetrahydrofuran and 25% propylene oxide, having an average molecular weight of 1060) and 0.015 mol of m-phenylene diisocyanate was heated for one hour at 100° C., under anhydrous conditions. The hot reaction mixture was further heated for an hour after the addition of 0.036 mol of solid 4,4'-methylene bis(cyclohexylisocyanate) and a small quantity (2 drops) of dibutyltin dilaurate. The resulting isocyanate-terminated intermediate had an NCO content of 2.47%. Chain-extension of this prepolymer with p-menthane-1,8-diamine in dimethylformamide solvent yielded a stable solution suitable for the production of non-yellowing elastic fibers or films.

EXAMPLE 4

A substantially linear polyether glycol (average molecular weight 1100) was obtained by the copolymerization of propylene oxide (31%) and tetrahydrofuran (69%). The polyether was reacted with 4,4'-methylene bis(phenylisocyanate) and solid 4,4'-methylene bis(cyclohexylisocyanate) under the conditions and in the proportions employed in Example 1 to yield an isocyanate-terminated intermediate having an NCO content of 3.04%. Chain-extension with p-menthane-1,8-diamine yielded a polymer suitable for the manufacture of non-yellowing elastic fibers and films.

EXAMPLE 5

A mixture of 0.08 mol of polyether (copolymerization product of 75% tetrahydrofuran and 25% propylene oxide, having an average molecular weight of 1260) and 0.04 mol of Nacconate 80 (isomeric mixture of 80% 2,4- and 20% 2,6-toluene diisocyanate) was heated for one hour at 100° C., under anhydrous conditions. The reaction mixture was further heated for an hour after the addition of 0.10 mol of solid 4,4'-methylene bis(cyclohexylisocyanate) and a small amount (2 drops) of dibutyltin dilaurate. The resulting isocyanate-terminated intermediate had an NCO content of 2.68%.

The intermediate (100 parts), in dimethylformamide (235 parts) solution, was chain-extended with p-menthane-1,8-diamine (5.42 parts, dissolved in 50 parts of dimethylformamide) at about 5° C. as in Example 1 above. The resulting viscous solution possessed excellent storage and produced non-yellowing elastic fibers or films.

EXAMPLE 6

The isocyanate-terminated intermediate of Example 5 above, was chain-extended with 1,4-cyclohexylene bis (methylamine). A dimethylformamide solution of the resulting polymer was suitable for the production of elastic fibers or films, but gelled in about three hours.

EXAMPLE 7

Trimethylenediamine was employed to chain-extend the isocyanate-terminated intermediate of Example 5 above; a dimethylformamide solution of the polymer was employed to produce non-yellowing elastic films.

EXAMPLE 8

The isocyanate-terminated intermediate of Example 5 above, was dissolved in dimethylformamide (100 parts prepolymer in 200 parts of solvent) and then chain-extended with hydrazine hydrate (in 30 parts of dimethylformamide). The resulting polymer solution was highly viscous (ca. 500 poises) and could be spun into a hot (80° C.) water bath at a rate of about 20 feet per minute to yield an elastic filament of about 600 denier.

To evaluate the above polymers for the manufacture of elastic fibers, the hot water elastic recovery of film-strip-fibers (uniform thin fibers stripped from 0.006 inch film cast on glass and cured for two hours at 120° C.) was measured. The hot water elastic recovery is defined as the percentage return to original length within one minute after the tension has been released from a fiber sample which has been elongated 50% and immersed in 90° C. water for one minute.

Table I

| Polymer (Example No.): | Hot water elastic recovery, percent |
|---|---|
| 1 | 90 |
| 2 | 70 |
| 3 | 80 |
| 4 | 80 |
| 5 | 80 |
| 6 | 70 |
| 7 | 20 |
| 8 | 60 |

My copending application Serial No. 410,257, filed of even date, relates to segmented substantially linear polyester-urethane-urea copolymers and fibers prepared therefrom.

I claim:
1. A segmented substantially linear polyetherurethane-urea copolymer prepared by a process comprising the following steps:
   (a) heating a difunctional hydroxyl-terminated polyether with an aromatic diisocyanate in a molar ratio of about 1.5:1 to about 2.5:1 to produce a hydroxyl-terminated polyether-urethane;
   (b) heating the hydroxyl-terminated polyether-urethane with an aliphatic diisocyanate to produce an isocyanate-terminated intermediate; and
   (c) admixing the isocyanate-terminated intermediate with p-menthane-1,8-diamine to produce the copolymer.
2. The copolymer as defined in claim 1 wherein the aliphatic diisocyanate is a cycloaliphatic diisocyanate.
3. The copolymer as defined in claim 2 wherein the cycloaliphatic diisocyanate is 4,4'-methylene bis(cyclohexylisocyanate).
4. An elastic fiber prepared by a process comprising the following steps:
   (a) heating a difunctional hydroxyl-terminated polyether with an aromatic diisocyanate in a molar ratio of about 1.5:1 to about 2.5:1 to produce a hydroxyl-terminated polyether-urethane;
   (b) heating the hydroxyl-terminated polyether-urethane with an aliphatic disocyanate to produce an isocyanate-terminated intermediate;
   (c) admixing the isocyanate-terminated intermediate with p-menthane-1,8-diamine to produce a segmented substantially linear polyether-urethane-urea copolymer; and
   (d) extruding the copolymer.
5. The elastic fiber as defined in claim 4 wherein the aliphatic diisocyanate is a cycloaliphatic diisocyanate.
6. The elastic fiber as defined in claim 5 wherein the cycloaliphatic diisocyanate is 4,4'-methylene bis(cyclohexylisocyanate).
7. A film prepared by a process comprising the following steps:
   (a) heating a difunctional hydroxyl-terminated polyether with an aromatic diisocyanate in a molar ratio of about 1.5:1 to about 2.5:1 to produce a hydroxyl-terminated polyether-urethane;
   (b) heating the hydroxyl-terminated polyether-urethane with an aliphatic diisocyanate to produce an isocyaate-terminated intermediate;
   (c) admixing the isocyanate-terminated intermediate with p-menthane-1,8-diamine to produce a segmented substantially linear polyether-urethane-urea copolymer;
   (d) dissolving the copolymer in an evaporable inert organic solvent;
   (e) applying the copolymer solution to a substrate; and
   (f) evaporating the solvent to form the film.
8. The film as defined in claim 7 wherein the aliphatic diisocyanate is a cycloaliphatic diisocyanate.
9. The film as defined in claim 8 wherein the cycloaliphatic diisocyanate is 4,4'-methylene bis(cyclohexylisocyanate).

References Cited

UNITED STATES PATENTS

| 3,105,062 | 9/1963 | Graham et al. | 260—77.5 |
| 3,180,854 | 4/1965 | Schneider et al. | 260—75 |
| 3,245,961 | 4/1966 | Fetscher et al. | 260—77.5 |
| 3,249,576 | 5/1966 | Phelisse et al. | 260—75 |
| 3,301,823 | 1/1967 | Gehm et al. | 260—75 |

DONALD E. CZAJA, *Primary Examiner.*

M. I. MARQUIS, *Assistant Examiner.*